United States Patent [19]

Bowerman

[11] 3,840,699

[45] Oct. 8, 1974

[54] TELEVISION SYSTEM FOR ENHANCING AND TRACKING AN OBJECT

[76] Inventor: William R. Bowerman, 1824 Mississippi St., Lawrence, Kans. 66044

[22] Filed: May 25, 1972

[21] Appl. No.: 256,876

[52] U.S. Cl...... 178/6.8, 178/DIG. 21, 178/DIG. 34

[51] Int. Cl........................... H04n 5/26, H04n 7/00

[58] Field of Search..... 178/DIG. 1, DIG. 5, DIG. 6, 178/DIG. 8, DIG. 20, DIG. 21, DIG. 34, 6, 6.8

[56] References Cited

UNITED STATES PATENTS

| | | | |
|---|---|---|---|
| 3,130,267 | 4/1964 | Engler | 178/6.8 |
| 3,301,949 | 1/1967 | Ullery, Jr. | 178/6.8 |
| 3,320,360 | 5/1967 | Thompson | 178/DIG. 21 |
| 3,335,716 | 8/1967 | Alt et al. | 178/DIG. 1 |
| 3,571,504 | 3/1971 | Kiuchi et al. | 178/DIG. 8 |
| 3,693,013 | 9/1972 | Dueker | 178/DIG. 21 |
| 3,693,154 | 9/1972 | Kubo et al. | 178/6.8 |

OTHER PUBLICATIONS

"Image Contrast Enhancement" – VM T. Townsend – IBM Technical Disclosure Bulletin, Vol. 13, No. 3, Aug. 1970.

*Primary Examiner*—Albert J. Mayer
*Assistant Examiner*—George G. Stellar
*Attorney, Agent, or Firm*—Morse, Altman, Oates & Bello

[57] ABSTRACT

An image enhancement system is provided for use with television equipment whereby a uniquely coated object within the field of view is enhanced to make it more readily observable to the viewer. A particular application involves coating a hockey puck, football or the like as used in a sporting event that is being televised with a material which reflects light of a particular frequency not normally present in ambient lighting conditions. A pair of ganged television cameras is employed, one of conventional design adapted to televise the entire scene and the other sensitive only to the particular frequency reflected by the coated object. The images from the two cameras are combined, with the coated object being enhanced with respect to the overall scene making it easily observable to the viewer. A tracking system may be employed that is responsive to the position of the enhanced image whereby the cameras will automatically follow the puck, ball or the like.

1 Claim, 2 Drawing Figures

TELEVISION SYSTEM FOR ENHANCING AND TRACKING AN OBJECT

BACKGROUND OF THE INVENTION

1. Field of the Invention

This invention relates to television systems and more particularly is directed towards a television tracking system adapted to enhance one or more selected objects within a field of view to make the objects more readily observable to the viewer.

2. Description of the Prior Art

Conventional televising equipment electro-optically converts a scene to electric signals according to light values of various parts of the scene. While equipment currently in use is satisfactory for most television needs, it tends to be somewhat deficient particularly for sporting events, in which a relatively small ball or puck is used. When a game is being televised, normally the camera must be kept at a long range focus in order that the overall play may be observed. However, when viewed in long range, the ball or puck becomes extremely difficult to follow because of its size as well as of the crowding and action of the players. Oftentimes even the camerman finds difficulty in following the course of the ball and, from time to time, may direct the camera elsewhere than where the ball is actually located. Viewers, of course, find this frustrating and it detracts from their enjoyment of the game.

It is an object of the present invention to provide a television system adapted to enhance a particular object in a televised scene whereby that object will be made more visible to the viewer. Another object of this invention is to provide a tracking system for television equipment whereby the television camera will follow a particular object within the televised scene.

SUMMARY OF THE INVENTION

This invention features a television system comprising at least a pair of cameras operatively connected to one another, one camera adapted to produce a conventional scanned image of a scene being televised and the other adapted to scan only a particular object in that scene which has been pre-treated to reflect a unique spectral image. The recorded images of both cameras are combined through processing circuitry such that the selected object is electronically enhanced and the combined transmitted scene, when reconstructed on a receiver, will produce a visibly enhanced object against the background of the total scene. Automatic tracking equipment may be provided that is operatively responsive to the position of the selected object whereby both cameras will automatically track the object. In a modification, one camera is employed together with a computer to electronically process the signal generated by the uniquely treated object and produce a moving positional symbol superimposed on the screen.

DETAILED DESCRIPTION OF THE PREFERRED EMBODIMENT

Figure 1:
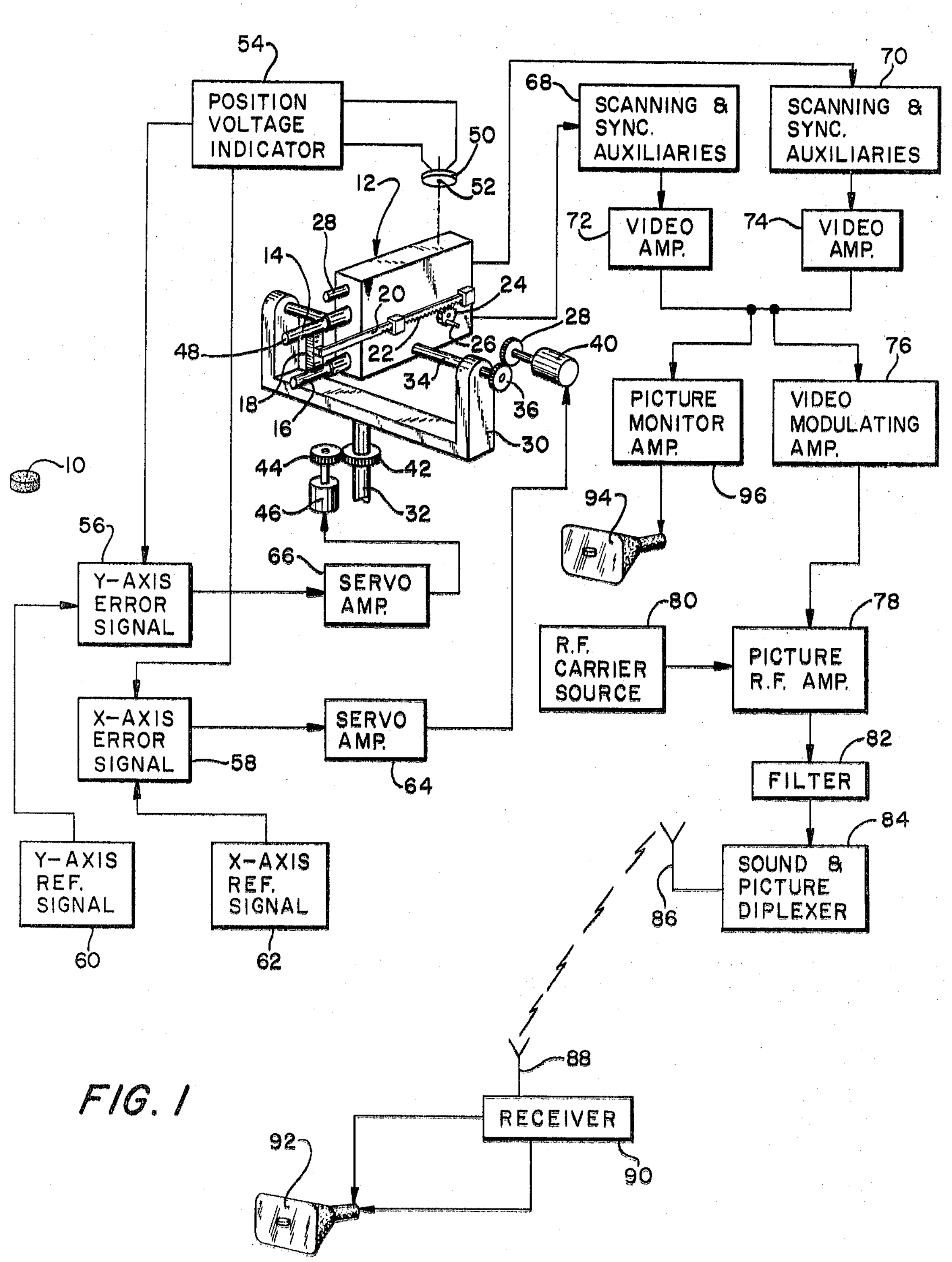
FIG. 1 is a somewhat schematic diagram of a television system made according to the invention, and, FIG. 2 is a view similar to FIG. 1 showing a modification of the invention.

Referring now to the drawings, there is schematically illustrated a diagram of the invention as embodied in a television tracking system which may, by way of example, be used to televise a sporting event such as a hockey game. When the system is used to televise a hockey game, a puck 10 is coated or impregnated with a material which will reflect a unique wavelength not normally present to any significant level in normal conditions. For example, a fluorescent coating may be employed to provide the unique reflective characteristics. Various coatings for this purpose are available and, where the event is indoors and artificially illuminated, an ultra-violet light may be employed as part of the illumination system whereby the coated puck will give off a unique spectral reflection distinct from the surrounding background.

The television equipment employed to televise the event includes a pair of television cameras 12 and 13 mounted on top of one another or side by side with each camera equipped with mechanically coupled lenses 14 and 16 typically of the zoom type. The lenses preferably are mounted for reciprocating movement to change the focus and the magnification of the televised scene and are connected to one another as by a bracket 18. The bracket 18 may be moved in and out by a shipping rod 20 slidably mounted to the side of the camera housing and provided with rack teeth 22 in mesh with a pinion 24 having a crank handle 26 by which the operator may manipulate the lenses. In practice, the camera 12 is equipped with a viewing lens by which the operator may view the scene that is being televised.

Both cameras are gimballed for movement about vertical and horizontal axes by means of a yoke 30 mounted for rotation about a vertical axis by means of a column 32, with a trunnion 34 extending between the arms of the yoke and fixed to the camera to permit camera movement about a horizontal axis. The end of the trunnion 34 is provided with a pinion 36 in mesh with a gear 28 driven by an X-axis servo-motor 40. The column 32 likewise is provided with a pinion 42 in mesh with a gear 44 driven by a Y-axis servo-motor 46. The servo-motors are parts of the tracking system by which the cameras automatically follow the motion of the puck 10 or other object such as a football, golfball, or the like, which has been coated with the unique spectral material.

The tracking system in the illustrated embodiment, functions in response to the upper camera which is equipped with an optical filter 48 on the lens 14, which filter, preferably, is of a narrow pass-band type selected to pass only that wavelength reflected by the treated puck 10 and substantially excluding all other parts of the spectrum. Interference filters or blocking filters may be employed for this purpose. In any event, the upper camera will view through the lens 14 only the image of the puck 10 and this image will be directed against a light position sensing device 50 such as a silicon Schottky barrier dual axis detector sold by United Detector Technology of Santa Monica, Calif. The light position sensing device 50 is a sensitive silicon photodetector that provides electrical output signals corresponding to the position of a light spot 52 on the surface and also provides an electrical signal corresponding to the intensity of the light spot. The voltage output of the device 50 thus is an analog signal corresponding to the coordinate position of the light spot 52 on the face of the device 50. The light spot 52 is focused by the lens 14 and, typically, when the spot is centered on the face of the device 50 the maximum voltage output is produced. The device 50 thus provides X and Y voltage signals corresponding to the coordinate position of the light spot. The signals are passed through a position voltage indicator 54 which, in turn, feeds the X and Y signals separately to a Y-axis error signal circuit 56 and to an X-axis error signal circuit 58. The error signal circuits 56 and 58 each receives separate inputs from a Y-axis reference signal generator 60 and an X-axis reference signal generator 62 whereby a differential signal is produced by each error signal circuit. The differential signals represent the distance that the light spot 52 is displaced from the center of the device 50 along both axes. The differential signals are then fed into servo-amplifiers 64 and 66 which drive, respectively, the servo-motors 40 and 46 whereby the camera automatically tracks the puck 10 and the light spot 52 is maintained on the center of the detector 50.

Various mechanical or electronic means may be incorporated to dampen the motion of the tracking equipment and prevent quick, jerky movements of the televised scene.

The image enhancement portion of the television system is obtained by combining the outputs of the two cameras so that one image is superimposed on the other. Each of the cameras is provided with separate scanning and synchronous auxiliary units 68 and 79, respectively, with each unit providing an output to video amplifiers 72 and 74, respectively. The outputs of the two amplifiers are combined and fed into a video modulating amplifier 76 which is combined with an RF carrier in a picture RF amplifier 78. The carrier signal is fed into the RF amplifier from an RF carrier source 80. The output of the RF amplifier is passed through a filter 82 into a sound and picture diplexer 84 from which it is transmitted by an antenna 86 to a receiving antenna 88 connected to a receiver 90 provided with a cathode ray tube 92. The transmitting equipment typically is provided with a monitoring tube 94 receiving the combined signals through a picture monitor amplifier 96.

Insofar as two separate images are generated by the two cameras with the lower camera televising the entire scene and the upper camera televising only the coated puck or the like, the image of the puck as viewed up by the upper camera will be superimposed over the total scene scanned by the lower camera so that the puck image will be enhanced with respect to all other background imagery. The enhanced puck iamge thus is made more easily visible by the viewers.

The system may be used to advantage to televise a wide variety of sporting events such as football, baseball or golf wherein a ball or other object is employed, or for races to determine the winners in a contest. For example, skiers may have their ski tips coated with a particular fluorescent substance so that it will be enhanced by a television system of the sort disclosed herein.

Figure 2:
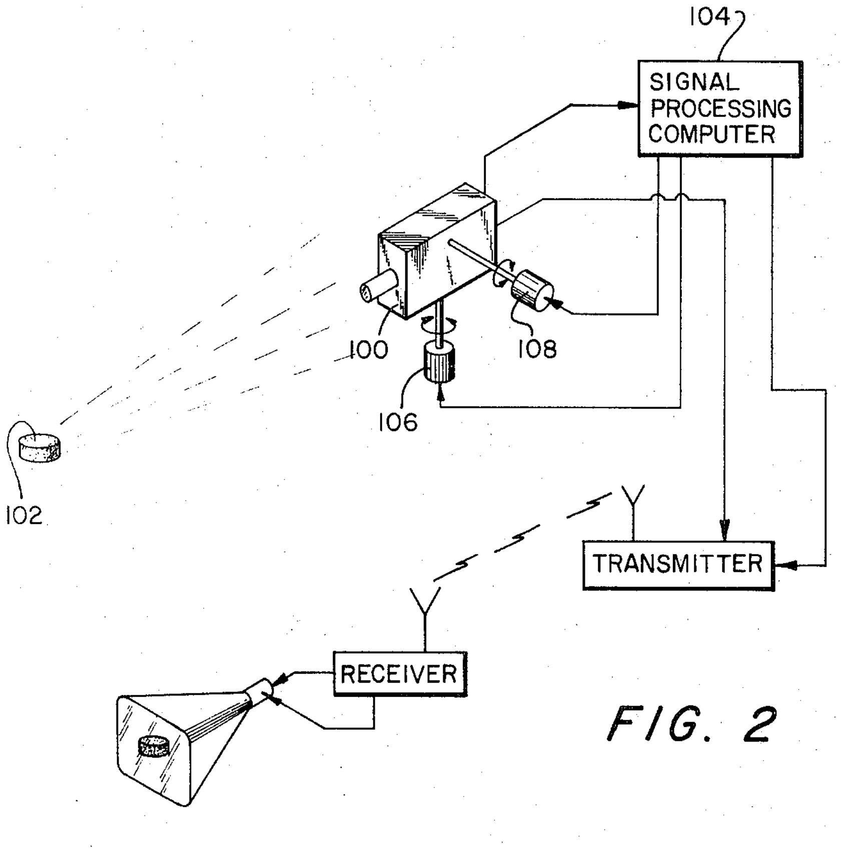

Referring now to FIG. 2 there is illustrated a modification of the invention and, in this embodiment, a single camera 100 is used to scan the entire scene including a specially treated object 102 such as a puck. The camera is sensitive to the unique wavelength of the object 102 and will generate unique output signals corresponding to the objects' image and its position. These signals are fed into a computer 104 for processing. The processed signals are then combined with normal camera output to either enhance the image of the object 102 or to substitute an appropriate symbol such as a dot, arrow or circle where the object should appear so that it may be more readily followed. Optionally, automatic tracking servos 106 and 108 may be employed and operated by the computer.

The computer may be programmed to detect a certain wavelength or a particular combination of wavelengths not normally found in a natural environment. This provides a capability of identifying a variety of objects and makes the system adaptable to a variety of applications in addition to sporting events. For example, railroad cars can be identified by a pattern of uniquely color coded areas located oppositely a television camera. Colored rectangles in different orientations may be used to generate identifying pulses in a BCD code. Broadly defined, the system involves the introduction of an artificial medium into a natural environment and scanning the natural environment with a television camera sensitive to the artificial medium and adapted to process the resulting image.

Having thus described the invention what I claim and desire to obtain by Letters Patent of the United States is:

1. A tracking television system for enhancing the image of an object having unique spectral reflection characteristics, comprising a. a first television camera adapted to scan a scene, b. a second television camera adapted to scan said scene and operatively connected to said first camera, c. an optical filter mounted to said second camera and having a passband characteristic corresponding to the spectral characteristics of said object, said second camera being sensitive only to said spectral characteristics, d. circuit means connecting siad first and second cameras for electronically combining the outputs of both cameras whereby the image of said object will be enhanced with respect to said scene, e. tracking means responsive to the position of said object for controlling the direction of both of said cameras, f. said tracking means including gimbal means mounting said cameras for movement about mutually perpendicular axes, a pair of servo motors drivingly connected to said gimbal means for moving said cameras about said axes in response to directional signals and optical position sensing means including a silicon Schottky barrier dual axis detector connected to said servo motors and positioned to receive an image of said object focussed thereon, said sensing means adapted to generate directional signals corresponding to the position of said image, and g. reference signal generating means connected to said detector and error signal generating means connected to said detector and to said reference signal generating means for generating directional signals for said servo motors.

* * * * *